(No Model.)
W. K. DANA.
APPARATUS FOR HARVESTING COTTON.
No. 564,974.  Patented Aug. 4, 1896.
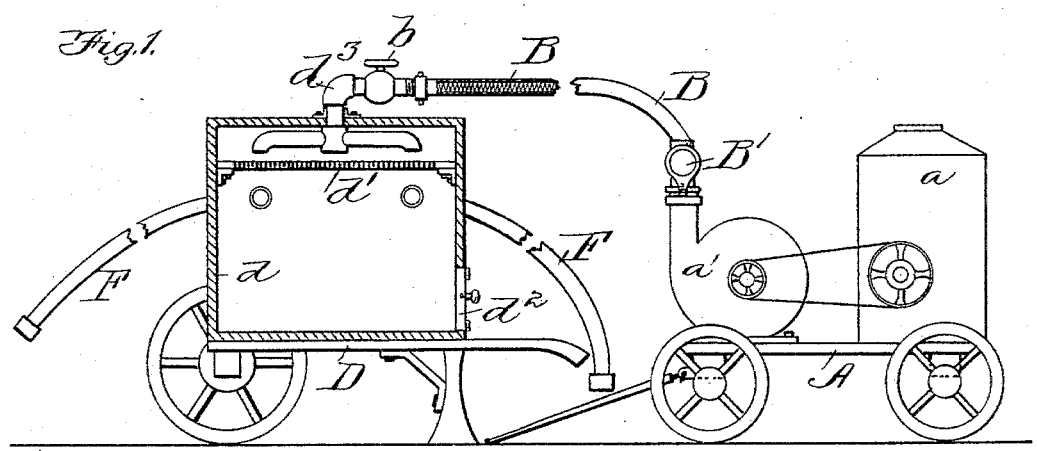
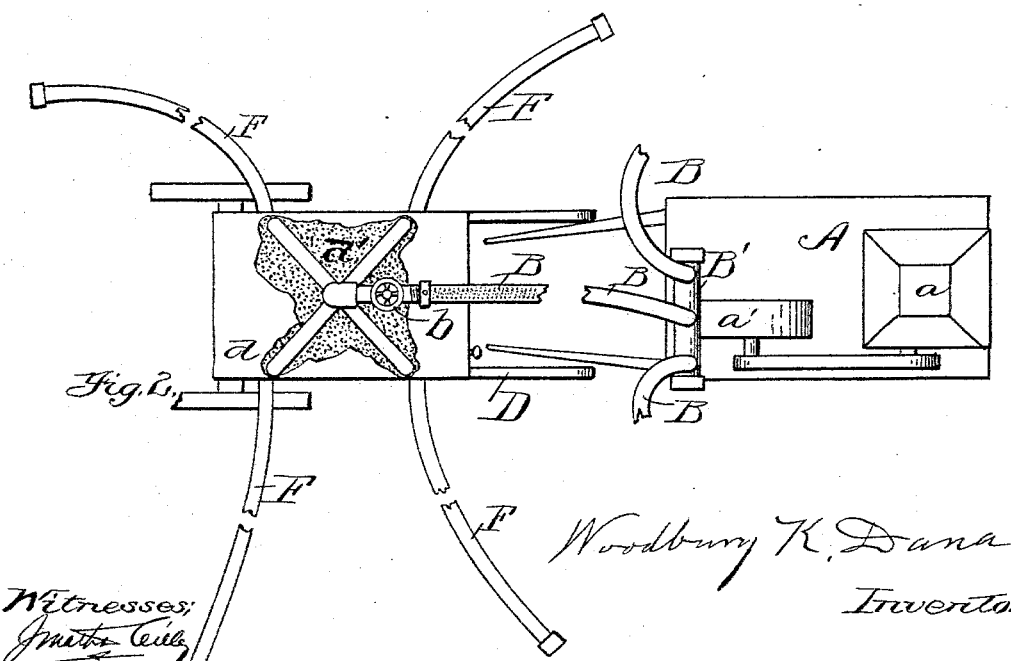

UNITED STATES PATENT OFFICE.

WOODBURY K. DANA, OF WESTBROOK, MAINE.

APPARATUS FOR HARVESTING COTTON.

SPECIFICATION forming part of Letters Patent No. 564,974, dated August 4, 1896.

Application filed July 12, 1894. Serial No. 517,269. (No model.)

*To all whom it may concern:*

Be it known that I, WOODBURY KIDDER DANA, of Westbrook, in the county of Cumberland and State of Maine, have invented a new and useful Apparatus for Harvesting Cotton, of which the following is a specification, reference being had to the accompanying drawings, in which—

Figure 1 is an elevation, partly in section, and Fig. 2 a plan, of my invention.

My invention consists in collecting the cotton from the plants in a portable receiver from which the air is exhausted by means of a fan and engine or motor to drive the fan, the receiver and the fan being connected by hose of sufficient length to enable the receiver to be carried to the plants and the cotton taken from the plants being carried by receiving-hose into the receiver.

In the drawings, A represents a vehicle on which the engine $a$ and fan $a'$ are carried. This vehicle in practice is so light that it may be drawn by one horse or mule, as the fan and oil-engine to drive it need not weigh more than a few hundred pounds.

The hose B is reinforced by a coil of wire or otherwise to prevent it from collapsing, and a convenient length is three hundred feet. The reinforcing-wire is contained within the outer hose-covering. I prefer to use several lines of hose B, each connected to a cross-hose B'; but each hose B connects with a receiver D.

The receiver D is composed of a vehicle carrying a box $d$, commonly about two feet and a half wide, four feet long, and three and a half feet high, with a grating $d'$ about four inches below its top, and door $d^2$ at one end. From the chamber above the grating $d'$ a number of pipes lead to the coupling $d^3$, to which the hose B is coupled.

The box $d$ is made strong enough to resist an external air-pressure of several pounds to the square inch, as when in use a partial vacuum is maintained in it by the action of fan $a'$, as is explained below.

Each receiving-hose F is coupled to its coupling $f$, preferably in the side of the box $d$ and only a few inches below the grating $d'$. Hose F is also non-collapsing, and in practice I prefer to use four sections of hose F with each receiver, so that four pickers may use each receiver, each picker taking one of the four receiving-hose, and it is convenient to make two of the four longer than the other two.

In operation the vehicle A is brought to the desired place and the engine is started, creating a partial vacuum in the receiver D, one or more, but in practice three, for the vehicle A can readily carry an engine and fan sufficient for three receivers D. One hand propels each receiver and takes care of the hose B, connecting it with the fan, while four other hands use the receiving-hose, each taking one piece of hose F, and each will bring the end of his hose F near the boll, when the blast of air entering that end of hose F will carry the fibers and seed into box $d$; and in case the cotton does not readily leave the boll the operator will loosen it, so that it will fly into the mouth of hose F. When box $d$ is filled, the cock $b$ is closed, door $d^2$ opened, and the box $d$ emptied, and thereafter door $d^2$ closed and cock $b$ opened ready for continued use. Thus a strip of the cotton-field say twelve rows wide and about three hundred feet long is picked, when vehicle A is moved with the rest of the apparatus in place to pick another strip.

Obviously the receiver may be adapted to be carried by an attendant, and in that case each will need only one receiving-hose F.

It will now be clear that my invention resides in an apparatus of which the essentials are a power-driven fan mounted with its motor upon a carriage and adapted to be readily moved from place to place; a main hose of considerable length to connect the fan and receiving vessel; a receiving vessel mounted upon a second carriage and adapted to be moved from plant to plant, and provided with a grating to prevent the cotton entering it from getting into the main hose, and a receiving-hose leading from the vessel, all so combined that when the fan is operated a partial vacuum will be maintained in the receiving vessel, and a blast of air thereby caused to flow through the receiving-hose, carrying with it the cotton to be picked, and depositing it in the receiving vessel.

I am aware of Patents No. 239,190, dated

March 22, 1891; No. 296,449, dated April 8, 1884, and No. 477,177, dated June 14, 1892, and I am also aware that other plans of using an air-blast in cotton-harvesting have been proposed, and I therefore make no claim to the use of an air-blast; but my invention differs from all other plans known to me in that I collect the cotton in a vessel in which a partial vacuum is maintained by a fan, which is connected with the receiving vessel by an exhaust-hose, the advantage being that the fan and its engine may remain in one place while the receiving vessel is carried from plant to plant, while the cotton passes through the receiving-hose only, and does not pass through the receiving vessel and out of that vessel through the long connecting-hose, as in Patent No. 477,177.

What I claim as my invention is—

In combination a receiving vessel mounted upon a carriage and having a screen therein; a flexible hose connected to the vessel on one side of the screen; a flexible hose one end connected to the vessel on the opposite side of the screen and the other end connected to a fan; that fan and its motor mounted together upon a second carriage, substantially as described.

WOODBURY K. DANA.

Witnesses:
FRANK HASKELL,
MARY R. RAYMOND.